(12) United States Patent
Karpala

(10) Patent No.: US 10,392,199 B2
(45) Date of Patent: Aug. 27, 2019

(54) PALLET AUTO BOX

(71) Applicant: Nova Packaging, LLC, Denver, CO (US)

(72) Inventor: Wojciech Karpala, Denver, CO (US)

(73) Assignee: Nova Packaging, LLC, Denver, CO (US)

( * ) Notice: Subject to any disclaimer, the term of this patent is extended or adjusted under 35 U.S.C. 154(b) by 59 days.

(21) Appl. No.: 15/875,739

(22) Filed: Jan. 19, 2018

(65) Prior Publication Data

US 2018/0312344 A1 Nov. 1, 2018

Related U.S. Application Data

(60) Provisional application No. 62/490,459, filed on Apr. 26, 2017.

(51) Int. Cl.
| | | |
|---|---|---|
| *B65B 53/02* | (2006.01) | |
| *B65B 65/00* | (2006.01) | |
| *B65G 47/08* | (2006.01) | |
| *B65G 57/03* | (2006.01) | |
| *B65G 61/00* | (2006.01) | |
| *B65G 57/22* | (2006.01) | |
| *B65G 57/06* | (2006.01) | |
| *B65G 57/00* | (2006.01) | |

(Continued)

(52) U.S. Cl.
CPC .......... *B65G 47/086* (2013.01); *B65G 57/00* (2013.01); *B65G 57/035* (2013.01); *B65G 57/06* (2013.01); *B65G 57/22* (2013.01); *B65G 61/00* (2013.01); *B65B 5/108* (2013.01); *B65B 35/50* (2013.01)

(58) Field of Classification Search
CPC ...... B65G 57/00; B65G 61/00; B65G 47/086; B65G 47/90; B65G 57/22; B65G 57/24; B65G 65/00; B65B 35/50; B65B 43/58; B65B 39/007; B65B 5/105; B65D 2519/00164; B65D 2519/00502; B65D 88/005; Y10S 414/12; Y10S 414/109
See application file for complete search history.

(56) References Cited

U.S. PATENT DOCUMENTS 2,015,054 A * 9/1935 Wikert .................. B62D 33/08
296/10
2,841,302 A * 7/1958 Reisman .................. B66F 9/18
108/55.1

(Continued)

FOREIGN PATENT DOCUMENTS

WO WO-2015113665 A1 * 8/2015 ............. B65B 35/50

*Primary Examiner* — Gregory W Adams
(74) *Attorney, Agent, or Firm* — Trenner Law Firm, LLC; Mark D. Trenner

(57) ABSTRACT

An example pallet auto box with robot palletizer includes a conveyor to move a pallet into a loading area adjacent a robot for loading bags onto the pallet. The example pallet auto box with robot palletizer also includes an auto box having at least one wall, and in an example four walls, that can be raised and lowered. The at least one wall is raised as the robot stacks bags onto the pallet to maintain a border around the edge of the pallet for the bags to be stacked on the pallet. At least one wall opens as a door or gate after the pallet has been loaded with bags so that the loaded pallet can be moved out of the loading area and a next pallet moved into the loading area. The at least one wall is lowered again for stacking bags onto the next pallet.

18 Claims, 20 Drawing Sheets

(51) Int. Cl.
*B65B 35/50* (2006.01)
*B65B 5/10* (2006.01)

(56) References Cited

U.S. PATENT DOCUMENTS

| | | | |
|---|---|---|---|
| 3,164,080 A | 1/1965 | Miller, Jr. | |
| 3,270,485 A * | 9/1966 | Knepper | B65B 67/04 |
| | | | 186/66 |
| 3,439,605 A * | 4/1969 | Hanley | B65B 27/02 |
| | | | 100/25 |
| 3,822,795 A * | 7/1974 | Salsburg | B65G 57/00 |
| | | | 198/434 |
| 3,844,422 A | 10/1974 | Smith et al. | |
| 4,098,051 A * | 7/1978 | Cordes | B65B 53/02 |
| | | | 53/258 |
| 4,260,309 A | 4/1981 | Lynn | |
| RE31,060 E * | 10/1982 | Lutz | B66D 1/52 |
| | | | 414/400 |
| 4,500,001 A * | 2/1985 | Daniels | B65D 71/0096 |
| | | | 100/265 |
| 4,546,593 A * | 10/1985 | Lasscock | B65B 53/02 |
| | | | 414/788.9 |
| 5,201,427 A * | 4/1993 | Dowty | B65D 61/00 |
| | | | 211/23 |
| 5,791,865 A | 8/1998 | Bublitz | |
| 5,833,431 A * | 11/1998 | Rosse, III | B65G 69/20 |
| | | | 414/607 |
| 5,951,238 A | 9/1999 | Duecker | |
| 6,045,324 A * | 4/2000 | Redman | B65G 57/302 |
| | | | 414/788.9 |
| 6,299,354 B2 * | 10/2001 | Nickell | B65D 88/1625 |
| | | | 220/9.2 |
| 6,581,999 B1 * | 6/2003 | Chapman | B65D 88/005 |
| | | | 296/26.04 |
| 7,033,130 B2 * | 4/2006 | Watson | B65G 59/00 |
| | | | 414/796.2 |
| 8,074,431 B1 | 12/2011 | Pierson et al. | |
| 8,468,781 B2 * | 6/2013 | Fritzsche | B65B 35/52 |
| | | | 414/791.6 |
| 8,826,832 B2 * | 9/2014 | Ness | E21B 21/01 |
| | | | 108/55.3 |
| 2012/0070263 A1 * | 3/2012 | Van Schijndel | B65G 47/90 |
| | | | 414/788.1 |
| 2013/0334222 A1 * | 12/2013 | Elliot | B65D 21/086 |
| | | | 220/4.12 |
| 2014/0246425 A1 * | 9/2014 | Janin | B65D 88/005 |
| | | | 220/1.5 |
| 2015/0360884 A1 * | 12/2015 | Redman | B65G 59/00 |
| | | | 414/404 |
| 2017/0225812 A1 * | 8/2017 | Johnsen | B65B 13/02 |

* cited by examiner

US 10,392,199 B2

PALLET AUTO BOX

PRIORITY CLAIM

This application claims the priority benefit of U.S. Provisional Patent Application No. 62/490,459 filed Apr. 26, 2017 titled "Pallet Auto Box With Robot Bag Palletizer" of Karpala, hereby incorporated by reference for all that is disclosed as though fully set forth herein.

BACKGROUND

Due to the nature of bags (e.g., having non-square sides), stacking pallets can result in the bags being stacked lopsided on the pallet. This is particularly true when the bags (e.g., bags of mulch, or anything else sold in a bag) are stacked automatically by robot, because the robot simply drops the bags onto the pallet.

In order to better shape the stacked bags, pallets have been provided in the form of a fixed box, and the bags are dropped into the box. These pallets are more expensive (i.e., the cardboard walls), or the pallet then has to be lifted up out of the box.

BRIEF DESCRIPTION OF THE DRAWINGS

FIGS. 3 and 4 are perspective views of an example pallet auto box, wherein FIG. 3 is a front view showing an exit gate, and FIG. 4 is a rear view showing an entry side.

DETAILED DESCRIPTION

Figure 1A:
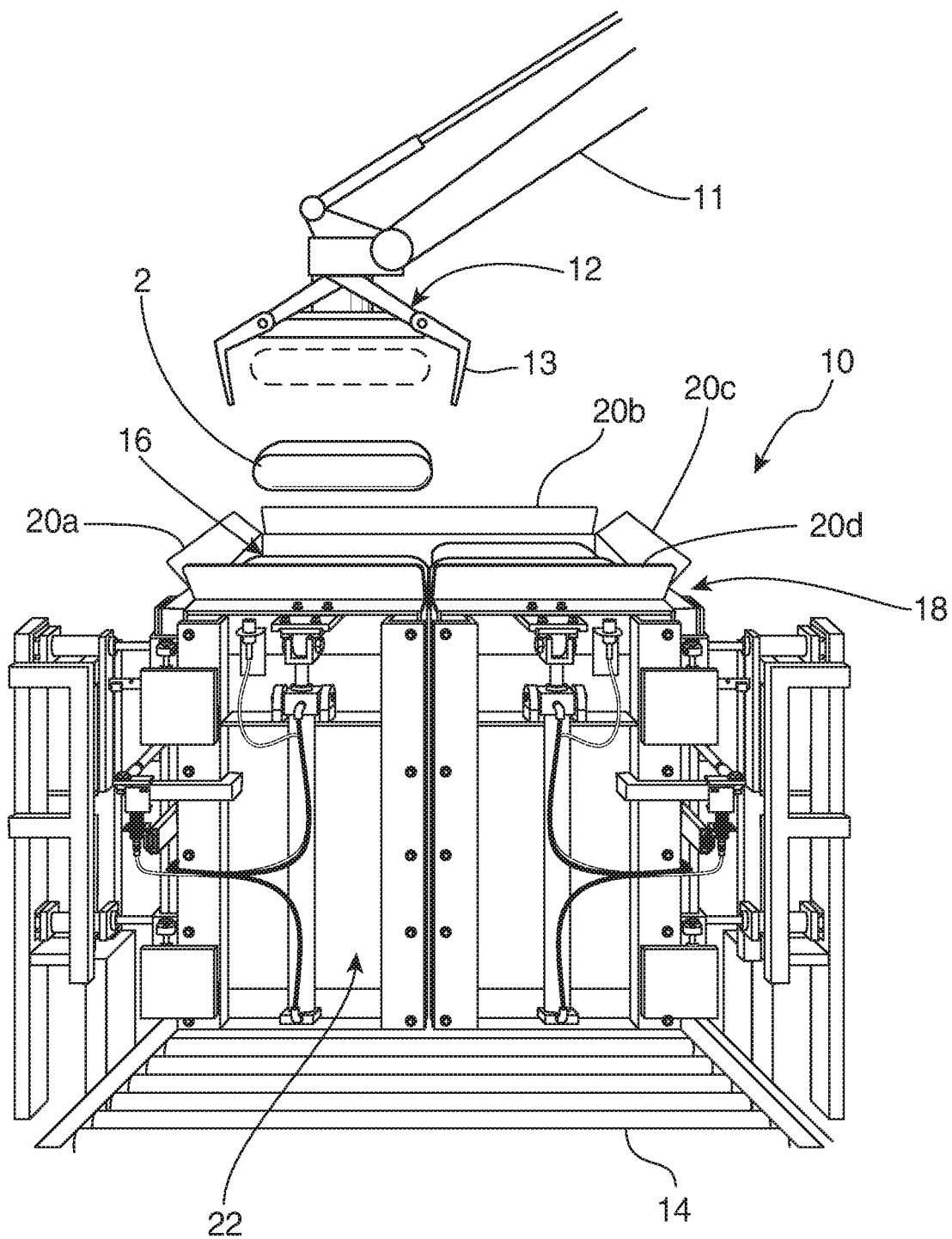
FIGS. 1A-F show an example pallet auto box shown with a robot palletizer as a robot arm is operated to load a bag onto a pallet.

A pallet auto box which may be implemented with a robot palletizer is disclosed. In an example, the pallet auto box with robot palletizer enables stacking any type, size, and/or number of product or items (e.g., bags) by robot. In an example, stacking is in a bag overlapping cycle on the empty pallet. In an example, stacking is without a pallet lift. The operations described herein enable maintaining the outside dimensions of the layer/full pallet, e.g., as defined by the size of the auto box.

In an example, the auto box has four side walls, and all walls have a mechanism to move the walls up/down (e.g.; raise/lower) to adjust the height of the autobox during stacking to different layers and pallet height. As such, the pallet auto box maintains the items inside of the pallet perimeter during loading. The items may be unconforming (e.g., not having flat sides such as boxes which can be readily loaded onto a pallet). The items can be entirely palletized by a robot (or other loader), e.g., without any special instruction or programming, to ensure the items stay within the perimeter of the pallet during loading.

In an example, the pallet auto box has two side walls with a mechanism to open and close the walls like a door or gate, e.g., when a full pallet is exiting the auto box and a next pallet is being positioned via the conveyor into the loading area formed by the pallet auto box walls.

In an example, a main front wall is divided into two smaller walls, that enable operation as a gate or door. Likewise, the rear wall may also be similarly configured to enable the next pallet to be brought in by conveyor to the loading area. Each of the smaller walls has a device to be able to open while a full pallet is exiting the auto box.

In an example, the pallet auto box can be installed directly on the floor (e.g., level) or can be install on the pallet conveyor frame.

During operation, the walls of the pallet box automatically adjust for different heights (e.g., going higher as the stack grows higher).

During pallet change-over, the auto box automatically readjusts itself (e.g., the walls are lowered) so that an empty pallet can enter the box loading area. When the full pallet is completed, the auto box automatically discharges the full pallet and readjusts for the next cycle.

The pallet auto box enables stacking bags by a robot (or manually) with an overlapping pattern, to form a "perfect" pallet. The pallet auto box can be installed on an existing conveyor frame, and makes the production line fully automatic and improves forklift driver operation.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described above are provided for purposes of illustration, and are not intended to be limiting. Other devices and/or device configurations may be utilized to carry out the operations described herein.

FIGS. 1A-1F and 2A-2F illustrate example operations which may be implemented by the pallet auto box 10 as it may be implemented with a robot palletizer 12. In an example, the components and connections depicted in the figures may be used. However, other configurations of the pallet auto box 10 with robot palletizer 12 may also be implemented. The operations shown and described herein are provided to illustrate example implementations. It is noted that the operations are not limited to the ordering shown. Still other operations may also be implemented.

In an example, the pallet auto box 10 includes an auto box 18 having at least one wall, but preferably four walls 20a-d. The walls can be raised, e.g., wall segment 61b is shown raised relative to wall segment 61a in FIG. 1b. The walls can also be lowered, e.g., as shown in FIG. 1a. In an example, the wall segments (e.g., 61a and 61b) slide relative to one another or "telescope". For example, the wall segments may slide relative to one another in a rail on each side of the wall segment. In another example, the wall segments may include a gear wheel and mating gear rail.

In an example, the wall segments (e.g., 61a and 61b) may be raised and lowered by pistons 21, The piston 21 is shown attached to the lower wall segment 61a on one end, and to the upper wall segment 61b on the opposite end. Hence, operating the piston 21 raises and lowers the walls segment 61b relative to the lower wall segment 61a, In an example, the pistons 21 includes pneumatic cylinders (e.g., dry compressed air operating at 80 PSI). However, the pistons 21 may also be hydraulic. Other mechanisms for raising and lowering the wall segments are also contemplated, and further examples are discussed below.

In an example, the pallet auto box 10 with robot palletizer 12 includes a conveyor 14 to move a pallet 1 (see, e.g., FIGS. 2B-F) into a loading area 16 adjacent a robot 12 having an arm 13 for loading bags 2 onto the pallet 1. At least one of the walls 20a-d is raised as the robot 12 stacks bags 2 onto the pallet 1. As such, the walls 20a-d form and maintain a border around the edge of the pallet 1 for the bags 2 to be stacked on the pallet 1.

Figure 1B:
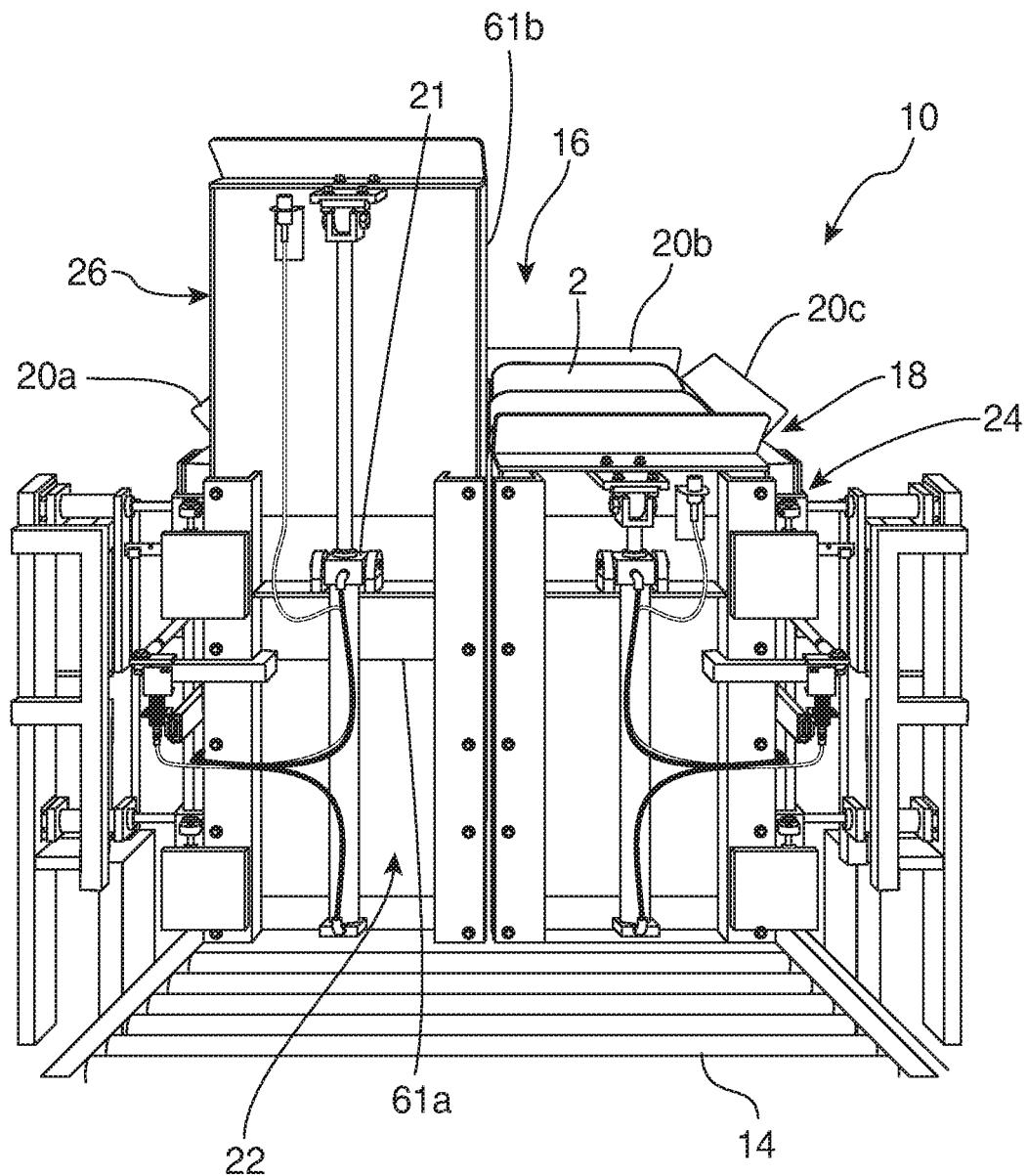

At least one of the walls (e.g., wall 20d) opens as a door or gate 22 after the pallet 1 has been loaded with bags 2. In FIGS. 1A and 1B, the wall 20d is illustrated as it may be configured as a gate 22 having two doors which may be hinged on the far right and left so that the door open in the center away from each other, e.g., as can be seen in FIG. 2B.

The doors of the gate 22 may open so that the loaded pallet 1 can be moved out of the loading area 16. A next pallet 1 can then be moved into the loading area 16 for loading with bags 2. At least one of the walls 20a-d may also be lowered again before stacking bags 2 onto the next pallet 1.

Figure 4:
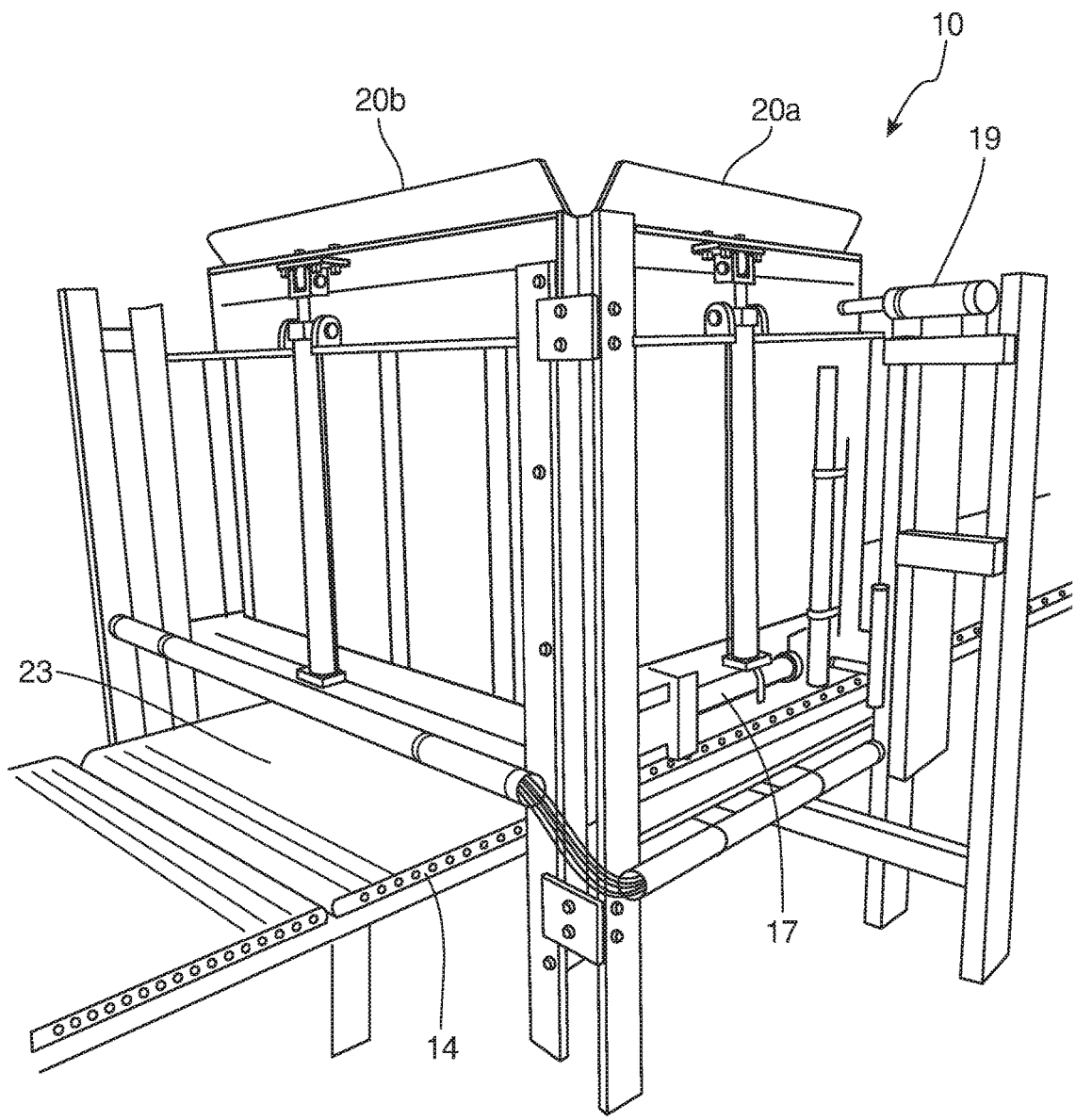

In an example, the two side walls 20a and 20c may also expand or "angle out" at the top to provide more room for the stacked pallet to exit the loading area, That is, the side walls 20a and 20c may be hinged 17 on the lower portion as seen in the view of FIG. 4, and be moved in and out near the upper portion, e.g., by piston 19 or other drive mechanism. It is noted that piston 19 may be air actuated, or hydraulic.

The pallet auto box 10 may be provided with a first conveyor 14 to move the pallet 1 into the loading area 16. A second conveyor 15 (see, e.g., FIGS. 10 and 1D) may move items (e.g., the bags 2) adjacent the loading area 16 to be picked up by the arm 13 of the robot 12 for loading onto the pallet 1.

Although illustrated herein primarily with reference to the robot 12, it is noted that loading may be by robot 12 (or other robot), by chute (not shown) directly onto the pallet 1, manual loading, or any other mechanism for moving items (e.g., bags 2) onto the pallet 1 within the walls 20a-d of the auto box 10.

The pallet auto box 10 includes a plurality of walls 20a-d forming four sides of a box when raised around the loading area 16. In an example, the walls 20a-d may include a first plurality of walls forming four sides of a box when raised to a first level 24 (e.g., illustrated in FIG. 1B) around the loading area 16. The walls may also include a second plurality of walls forming four sides of a box when raised to a second level 26 (e.g., illustrated in FIG. 1B) around the loading area 16. In an example, the first level of walls 24 may slidably engage with the second level of walls 26. The second plurality of walls raise higher than the first plurality of walls at the first level 24, to form the second level 26.

After loading, the gate 22 opens and the walls 20a-d pull away from the loading area so that the pallet 1 can be moved out of the auto box 10. A new pallet 1 can then moved via the conveyor 14 into the loading area 16 of the auto box 10. The walls 12a-d lower again before loading the next pallet 1.

FIGS. 1A-F show an example pallet auto box 10 with robot palletizer 12 as a robot arm 13 is operated to load a bag 2 onto a pallet 1. FIG. 1A shows an example pallet auto box 10 with robot palletizer 12 as a robot arm 13 drops a bag 2 of mulch to be loaded onto a pallet 1 into a loading area 16. The robot arm 13 may grasp the bag 2 from another conveyor 15, and then move into position over the loading area 16. In FIG. 1A, the robot arm 13 is positioned to drop a bag 2 of mulch onto the pallet 1 in the auto box 10. In FIG. 1B, the walls 20a-d have started to move up from a first level 24, to a second level 26.

Although only two levels 24 and 26 are illustrated in the operations of FIGS. 1A-E, it is noted that the walls may extend to any number of levels beyond the second level 26. For example, the auto box may be formed by a first set of walls (or wall portions) extending to a first level 24, a second set of walls (or wall portions) extending to a second level 26, a third set of walls (not shown) extending to a third level (e.g., above the second level 26), and so on. Multiple levels may enable the use of shorter wall segments and/or a taller autobox 10.

Figure 1C:
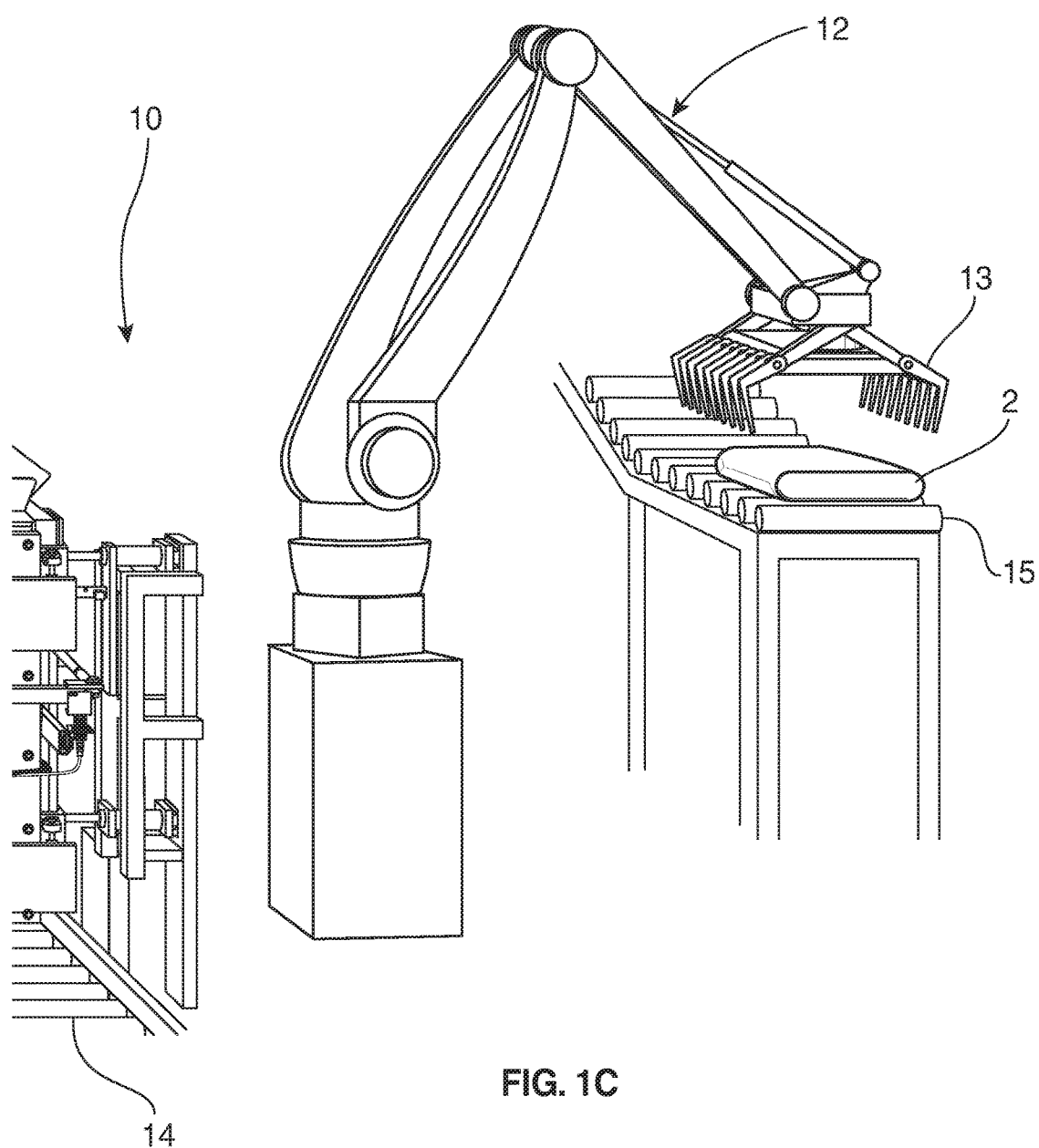
Figure 1D:
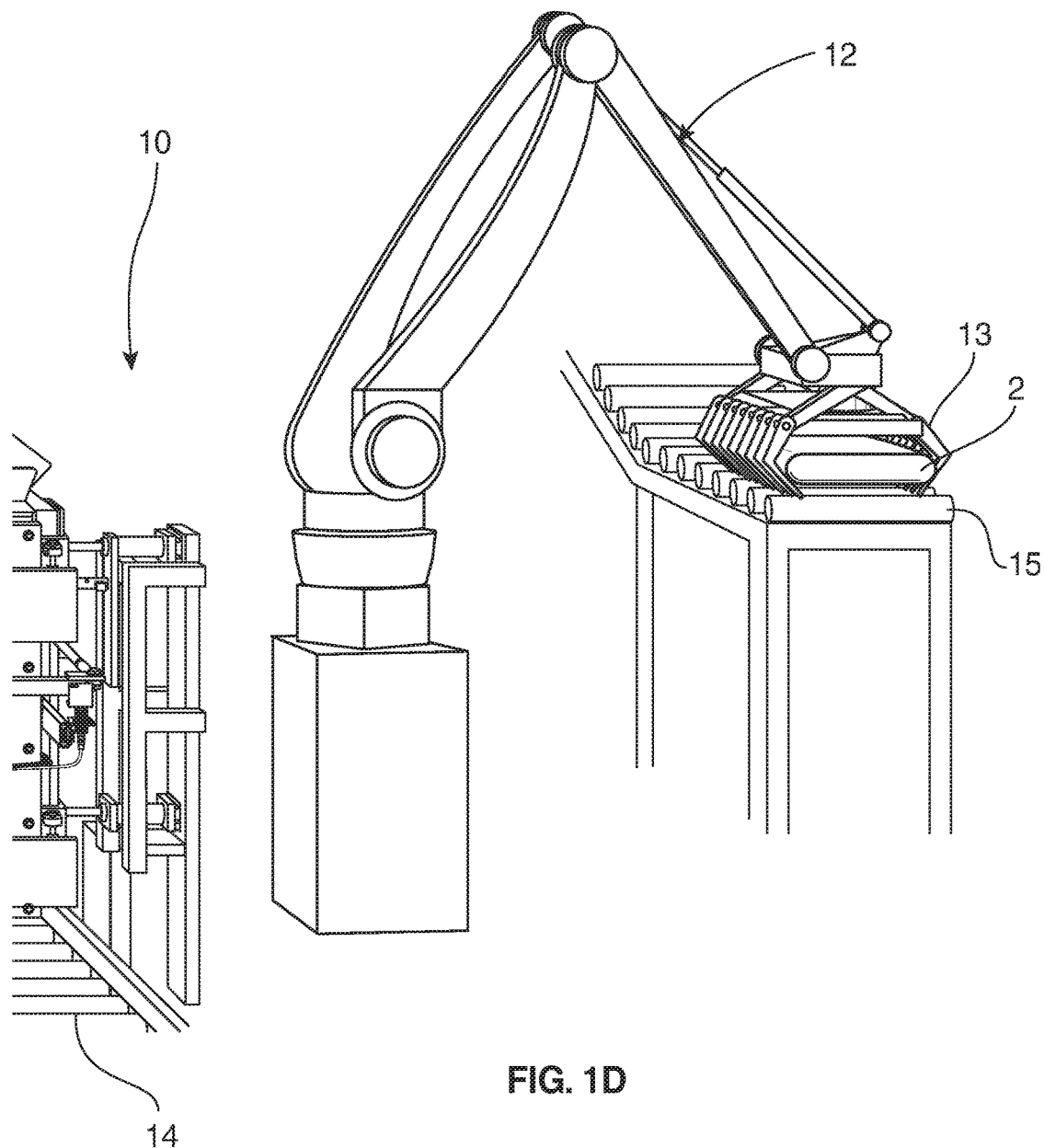
Figure 1E:
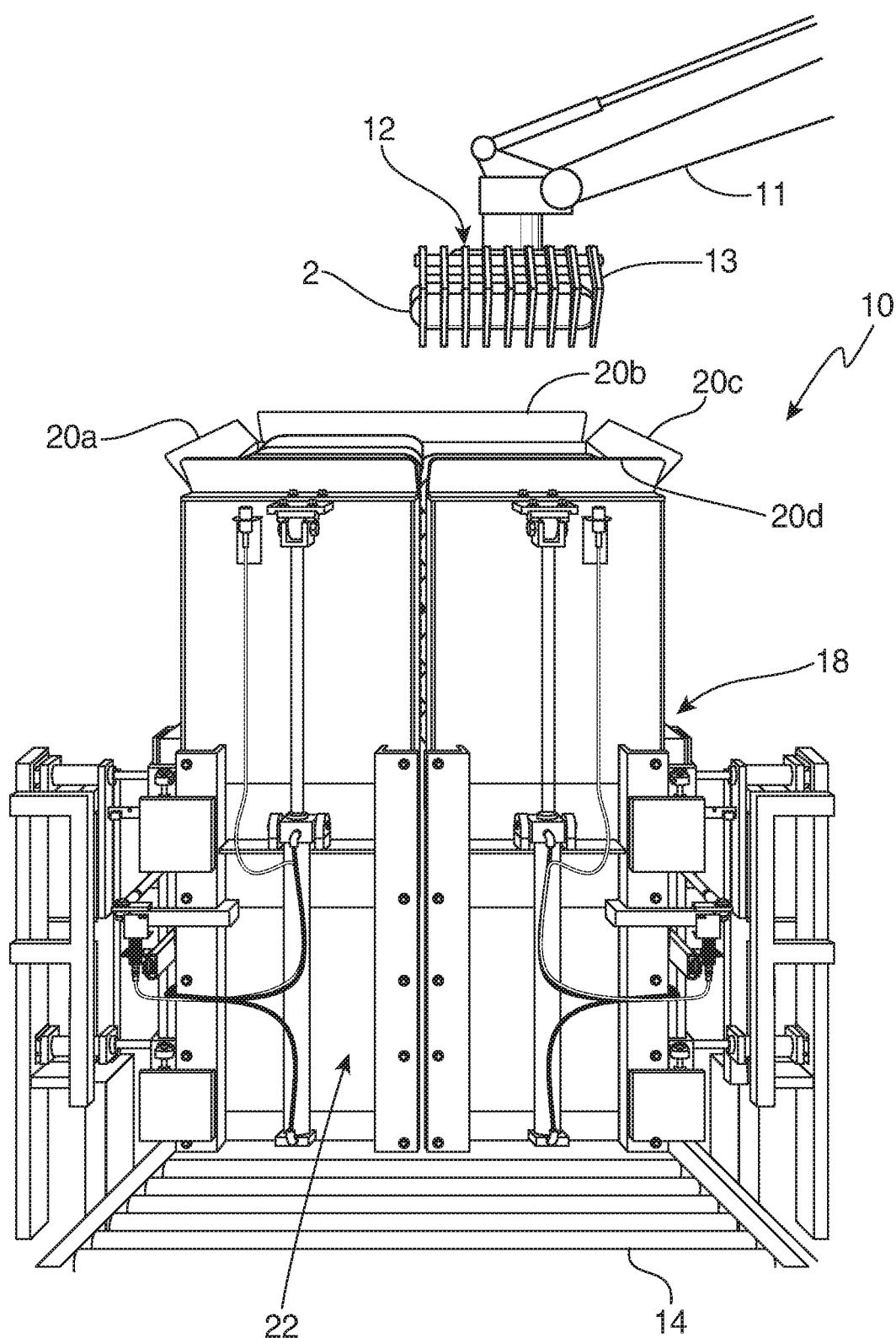
Figure 1F:
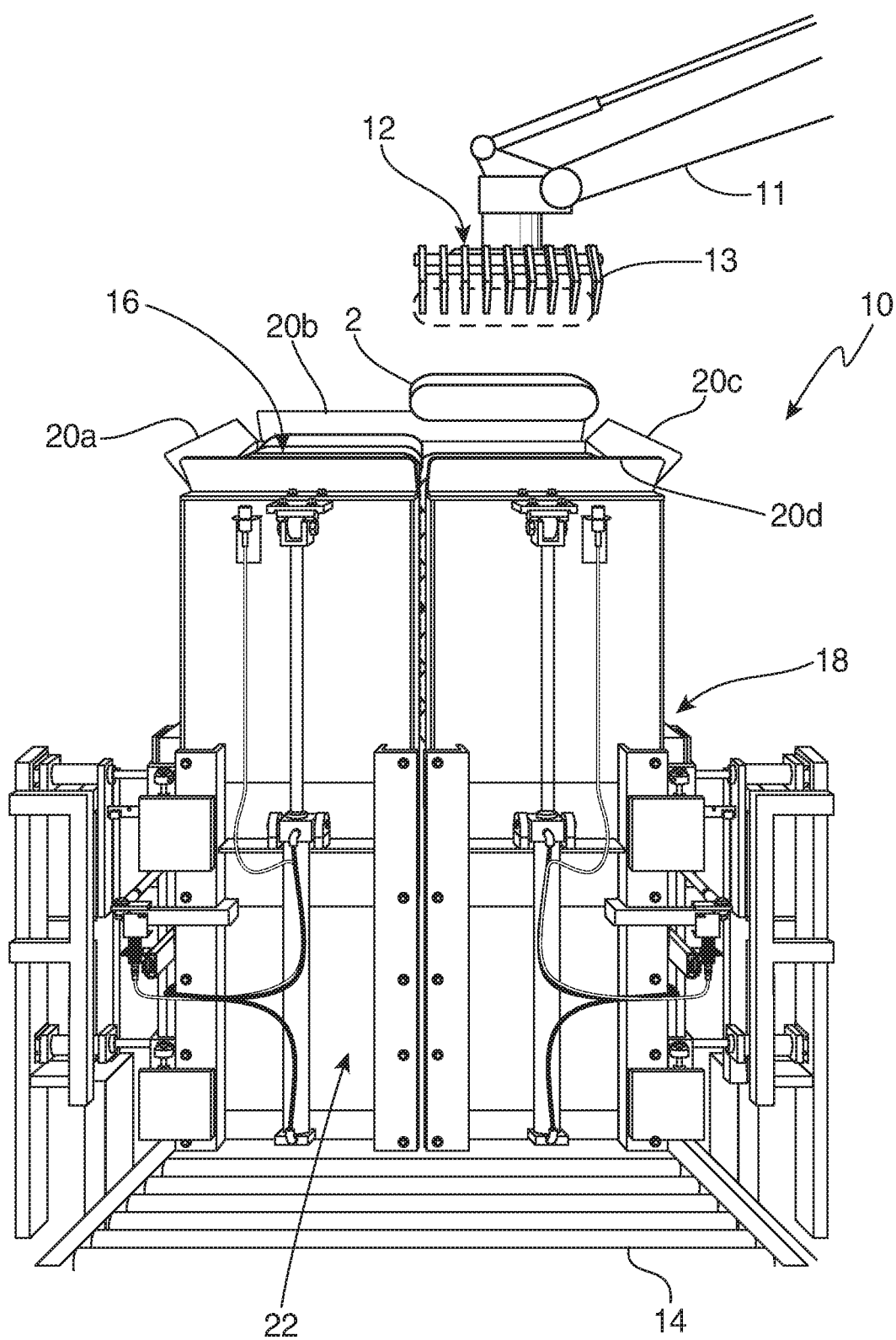

In FIGS. 1C-1D, the robot arm 11 is shown retrieving another bag 2 from the conveyor 15. In FIGS. 1E-1F, the grip 13 of the robot arm 11 is again positioned to drop the bag 2 of mulch onto the pallet 1 in the auto box 10. This time, the walls 20a-d have been raised to the second level 26, extending the height of the box formed around the pallet 1, for loading the bags 2 on the pallet 1. In FIG. 1E, the grip 13 of the robot arm 11 has released the bag 2 of mulch, and may return to the second conveyor 15 to pick up another bag 2 of mulch 1. This process may repeat until the pallet 1 is full or stacked to the desired height.

Figure 2A:
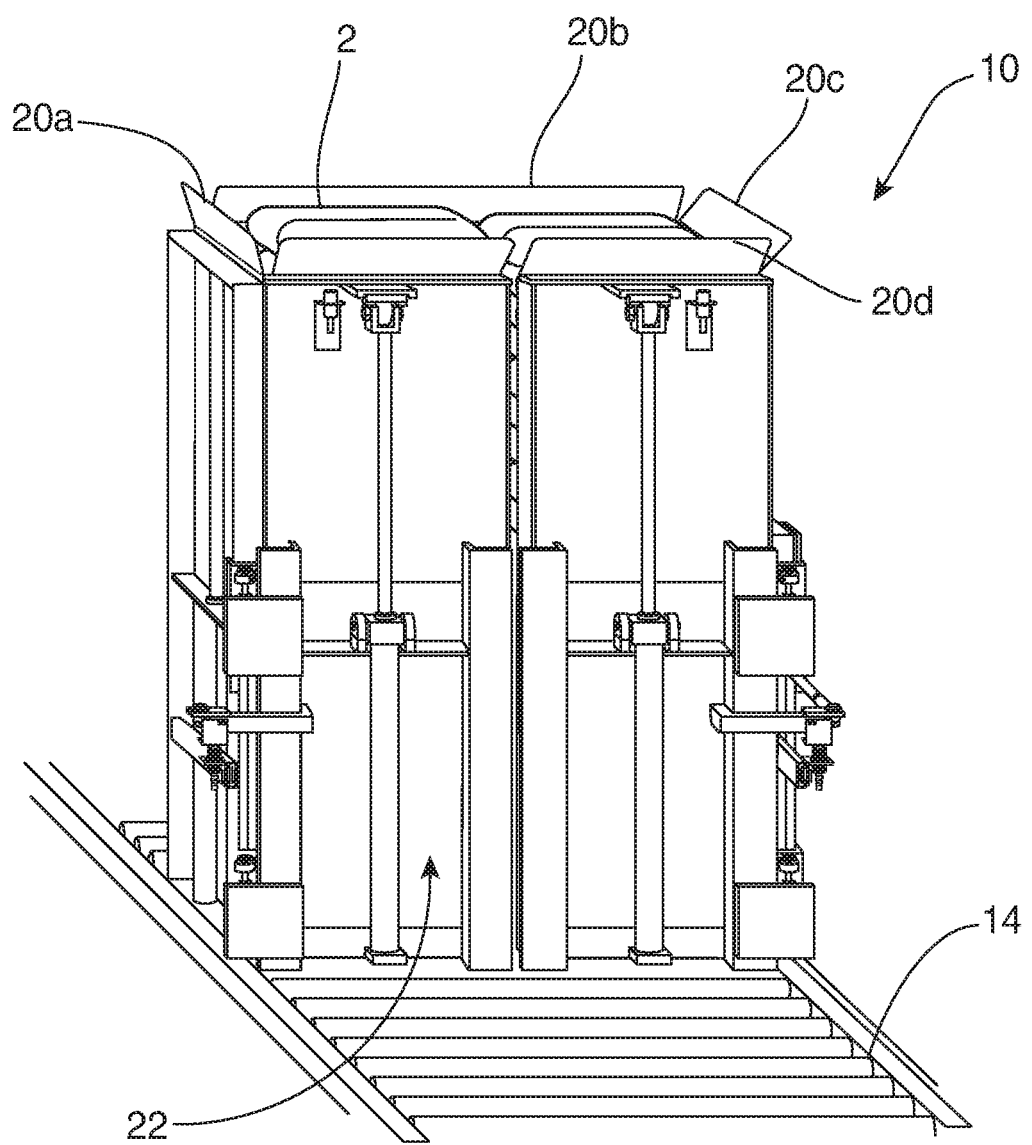
FIGS. 2A-F show an example pallet auto box with robot palletizer as the walls release during exit of a pallet from the walls.
Figure 2B:
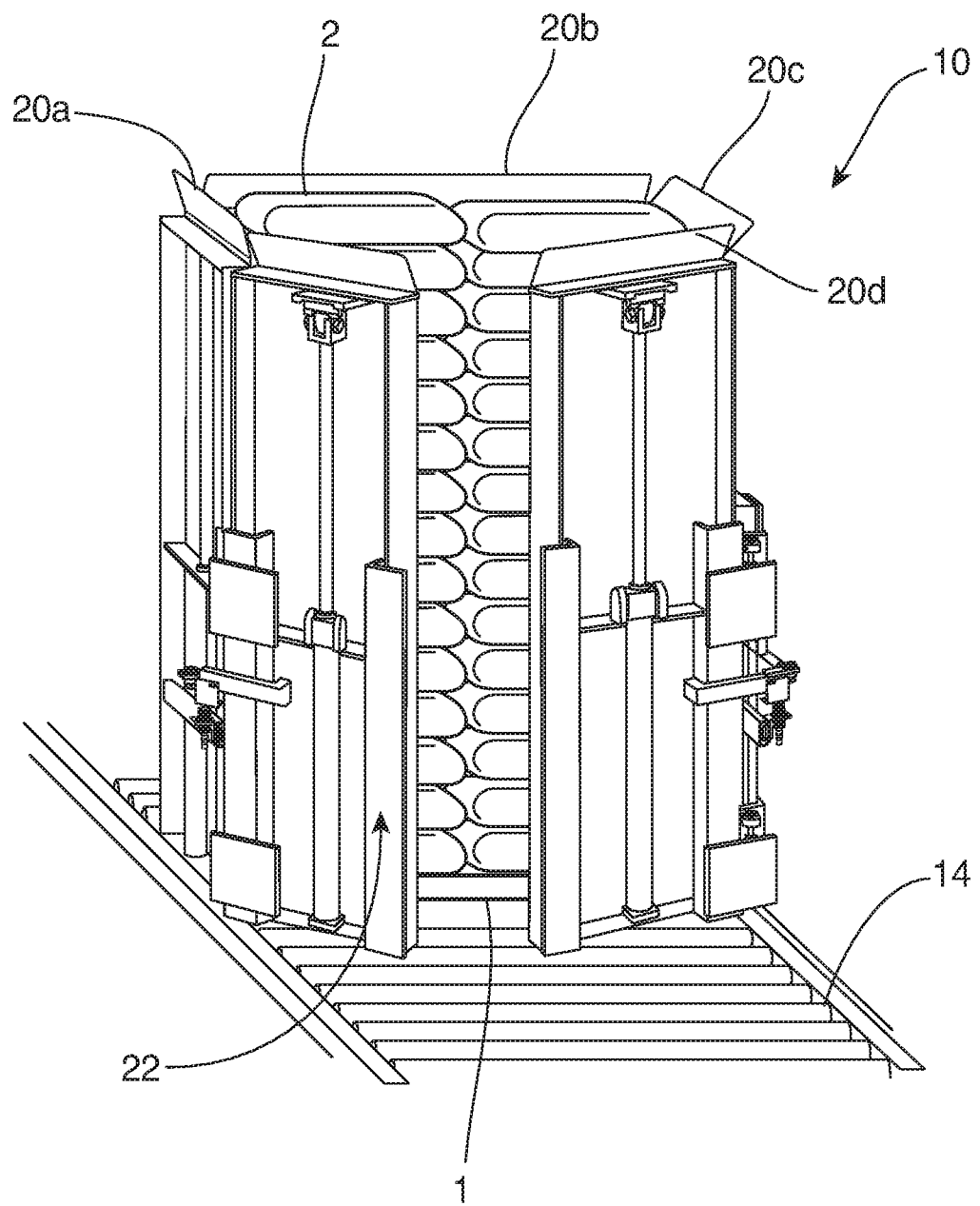
Figure 2C:
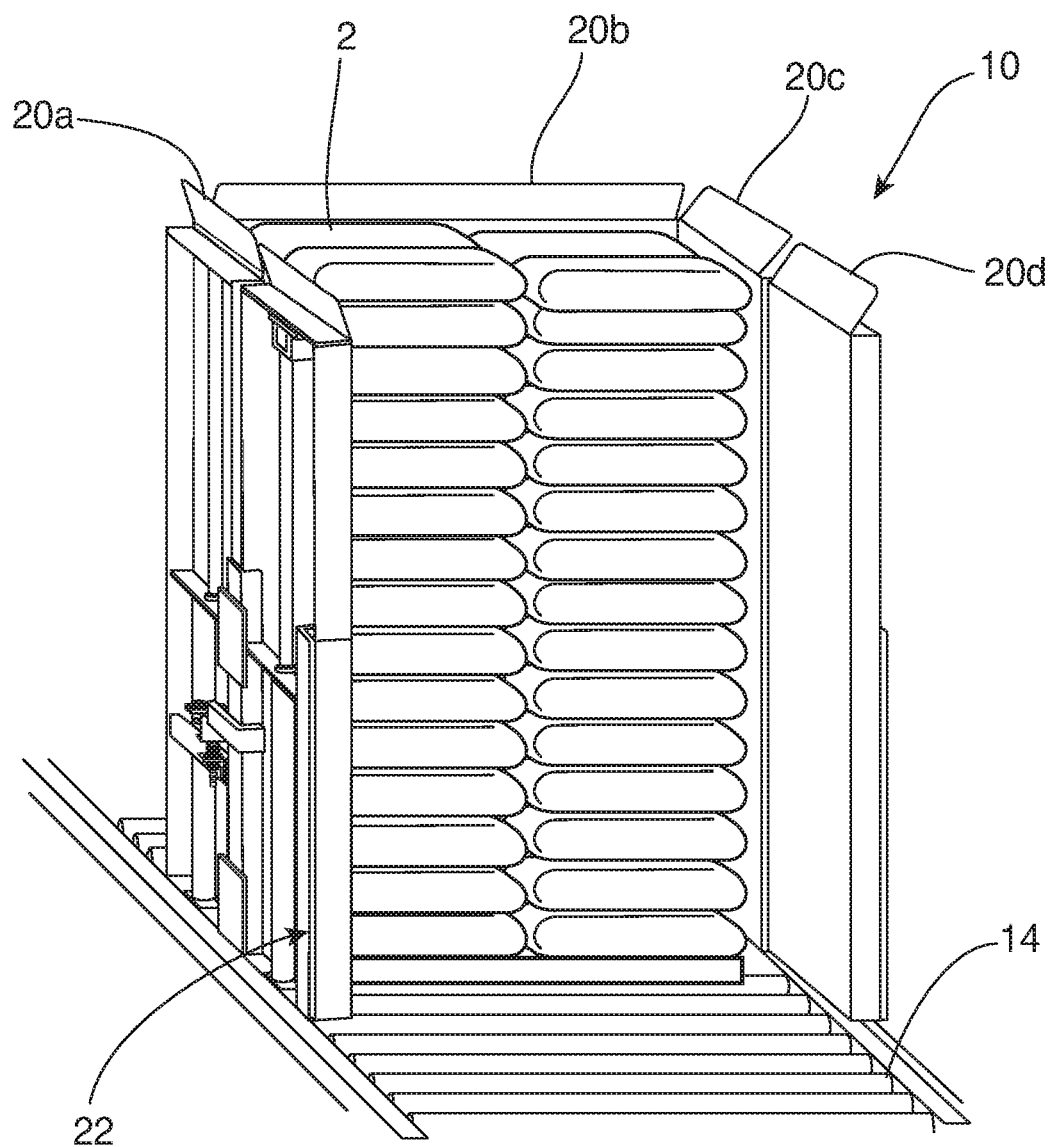
Figure 2D:
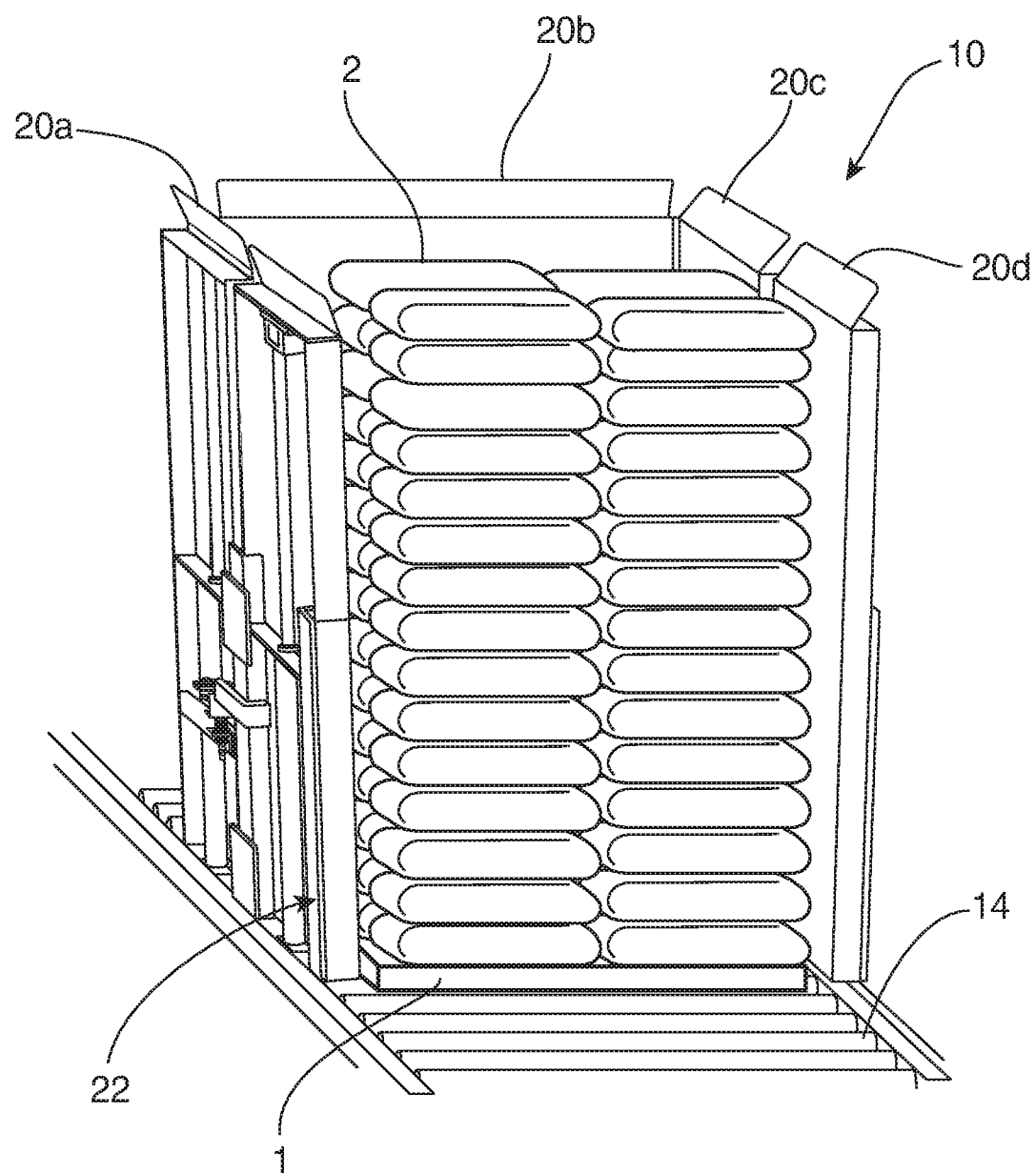
Figure 2E:
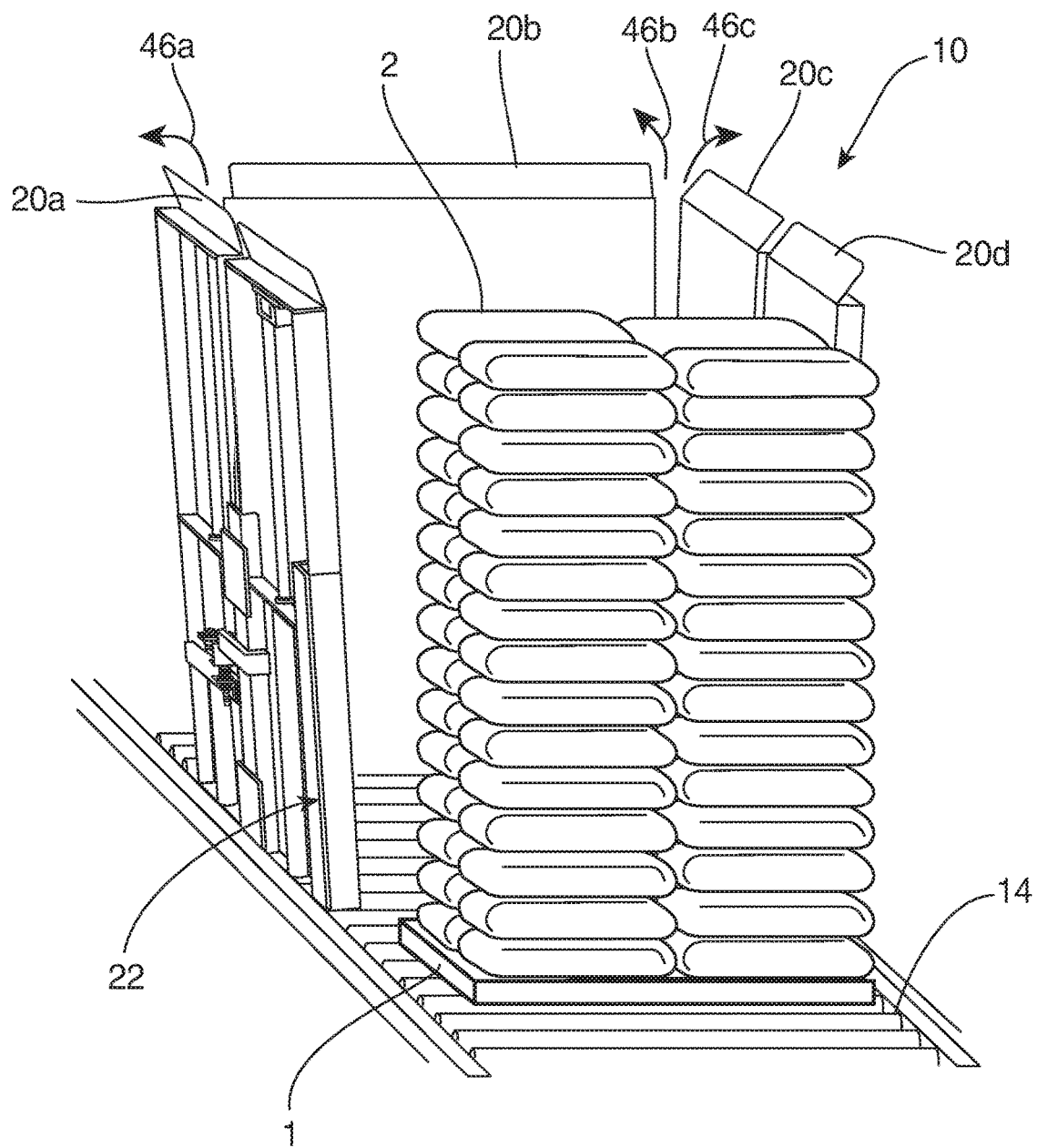
Figure 2F:
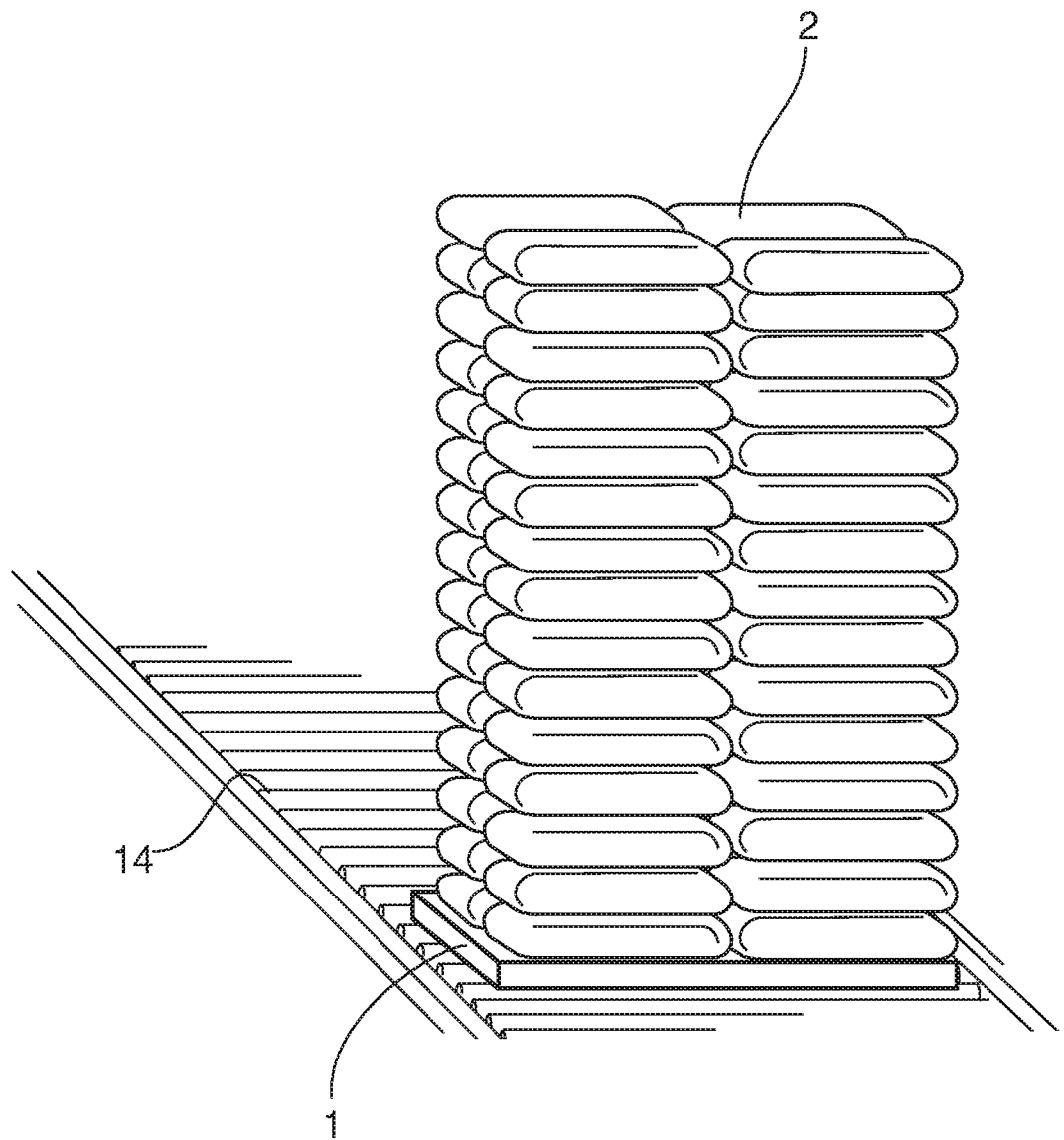

FIGS. 2A-F show an example pallet auto box 10 with robot palletizer 12 as the walls 20a-d release during exit of a pallet 1 from the walls 20a-d after the pallet 1 is full (or loaded to the desired height) as shown in FIG. 2A. FIG. 2B-C shows an example pallet auto box 10 as the gate 22 opens and the walls 20a-d release during exit of a pallet 1 from a box formed in the loading area 16 by the walls 20a-d. In FIG. 2D, the walls 20a-d begin to move away from the stacked bags 2 of mulch and the pallet 1 of mulch exits on a conveyor 14. In FIG. 2E, the pallet 1 has fully exited the loading area. During and/or after exit of the pallet 1, the walls 20a-d may move back down, e.g., to the first level 24. FIG. 2F shows a pallet 1 stacked with bags 2 (e.g., bags of mulch).

While the illustration in FIGS. 1A-1F and FIGS. 2A-2F illustrate loading bags 2 of mulch onto a pallet 1, it will be readily understood by those having ordinary skill in the art that the auto box 10 can be implemented to stack any items onto a pallet 1 or other base or platform, in a controlled manner, forming a substantially even-perimeter about the pallet 1, without the pallet 1 needing to have cardboard or other sidewalls provided on and around the perimeter of the pallet 1.

Figure 3:
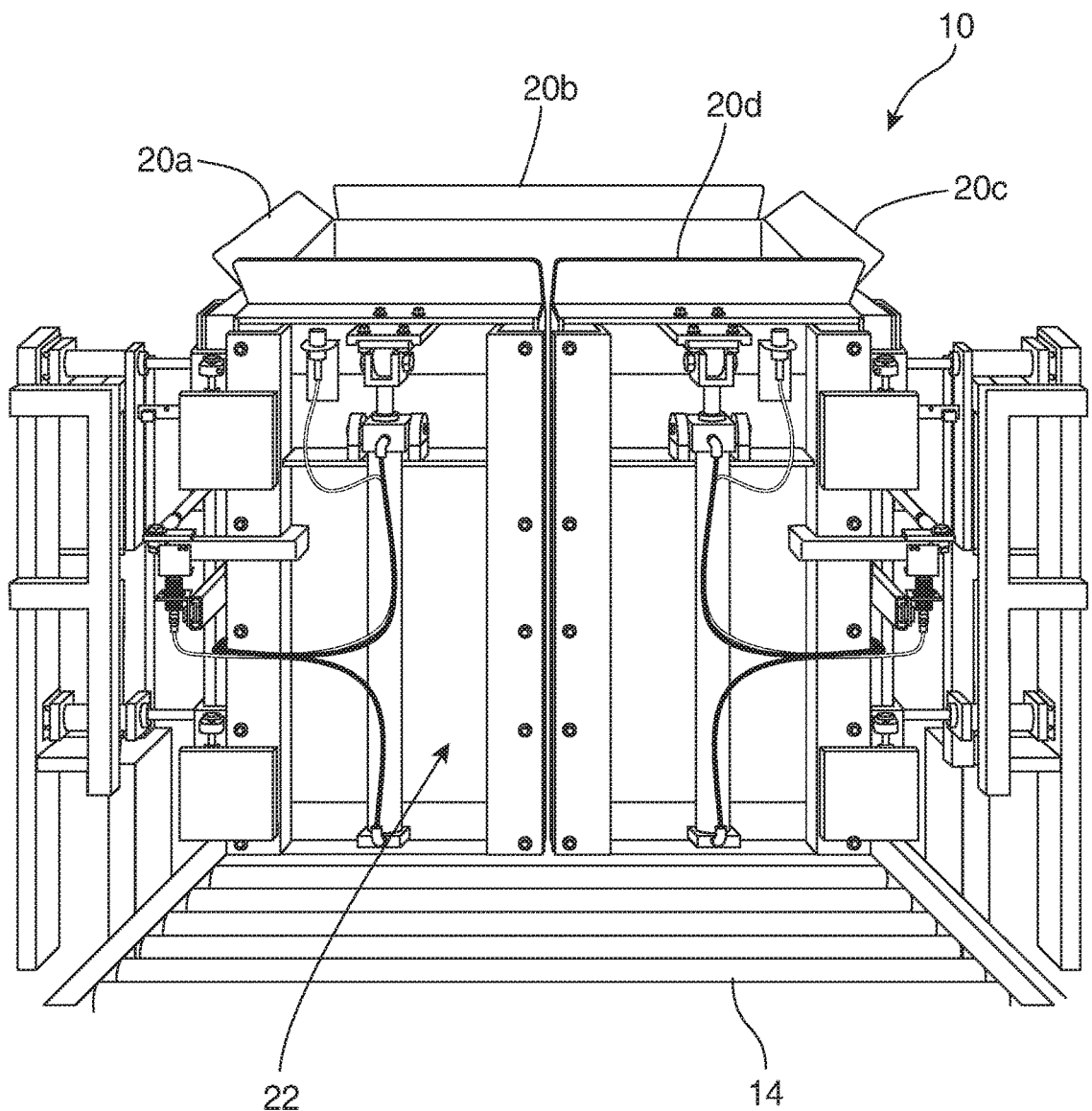

FIGS. 3 and 4 are perspective views of an example pallet auto box 10. The pallet auto box 10 shown in FIGS. 3 and 4 includes at least one wall 20a-d that raises and lowers adjacent a loading area 16 for a pallet 1. The pallet auto box 10 also includes a front-end gate 22. A back-end gate, not illustrated in the drawings, may also be provided.

In an example, the gate 22 may be formed by one of the walls (e.g., the wall 20d over the conveyor). In an example, the auto box 10 has four walls forming a square or rectangular box about the perimeter of a pallet 1. The wall(s) 20a-d may be provided initially at, or may raise to, a first level 24 to receive items (e.g., bags 2) on the pallet 1. The wall(s) 20a-d are raised during loading of the pallet to maintain a border around the loading area 16 for the items to be stacked within the loading area 16 on the pallet 1.

The wall(s) 20a-d may also raise to a second level 26 (and a third level, and so on) to receive more items stacked higher on the pallet 1. By raising the walls 20a-d gradually as the pallet 1 is loaded higher, the arm 11 of the robot 12 does not need to be raised as high during loading of the lower portions of the pallet stack. Gradually raising the walls also helps reduce the possibilities of whatever is being dropped onto the pallet 1 from breaking (e.g., a mulch bag breaking open). Gradually raising the walls also helps with alignment of the bags 2 or other items being loaded onto the pallet 1. That is, the bags 2 do not have as far to fall from the grip 13 of the robot 12.

The gate 22 opens after the pallet 1 has been loaded so that the loaded pallet 1 can be moved out of the loading area 16, and a next pallet 1 can be moved into the loading area 16. In an example, the rear wall 20b is fixed or stationary. An opening 23 is provided under the wall 20b so that the next pallet can be fed into the loading area 16 on the conveyor 14, e.g., as seen in FIG. 4. In addition, the walls 20a-d may be lowered during and/or after the pallet 1 is removed from the loading area 16 for stacking bags 2 onto the next pallet 1.

Figure 5:
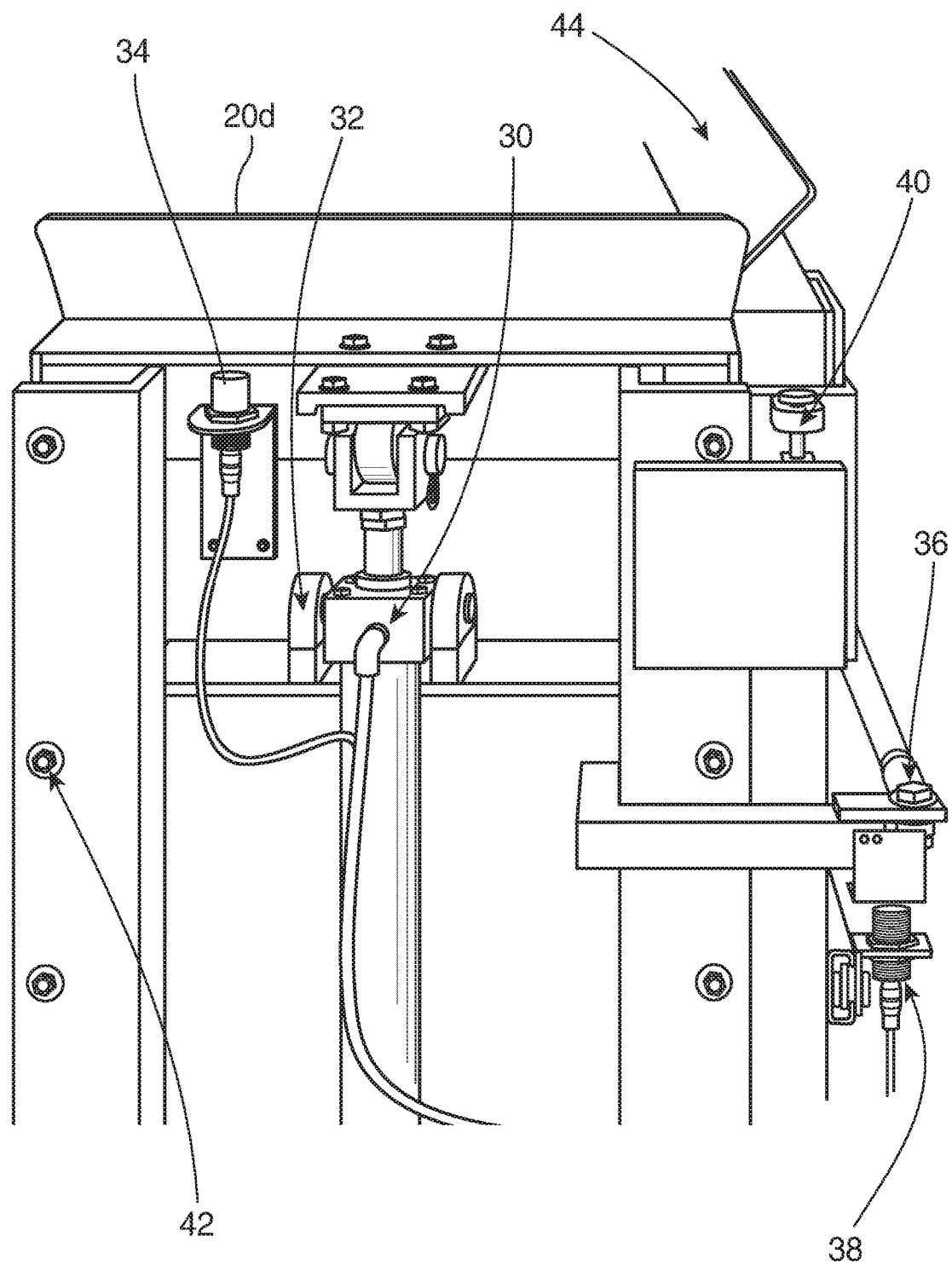
FIG. 5 is a perspective view of an example exit gate.

FIGS. 3 and 5 show a perspective view of an example gate 22. FIG. 4 is a rear view of the autobox 10. In an example, there is a pneumatic actuator 30 for the gate 22. This is illustrated as a front trunnion mounted air cylinder. When extended, the front trunnion mounted air cylinder raises the wall on the one of the door(s)/gate(s).

In an example, the mounting of the front trunnion mounted air cylinder is by tapped base pillow block bearings 32. This mounting 32 configuration enables some movement. This is to prevent the mechanism from binding.

To the left side of the actuator 30 is a cylindrical shaped proximity sensor 34 mounted to the lower wall segment (e.g., at the first level 24). The proximity sensor 34 is shown as it may have a wire coming out of the bottom. The proximity sensor 34 detects if the upper wall segment is in a lowered position (e.g., at level 24), or a raised position (e.g., at level 26).

On the right side of the drawing figure is another actuator 36. The actuator 36 opens the doors of the gate 22. The actuator 36 may be mounted and actuated using a similar mechanism as that which was described above for the actuator 30 that raises/lowers the wall segments.

Figure 6:
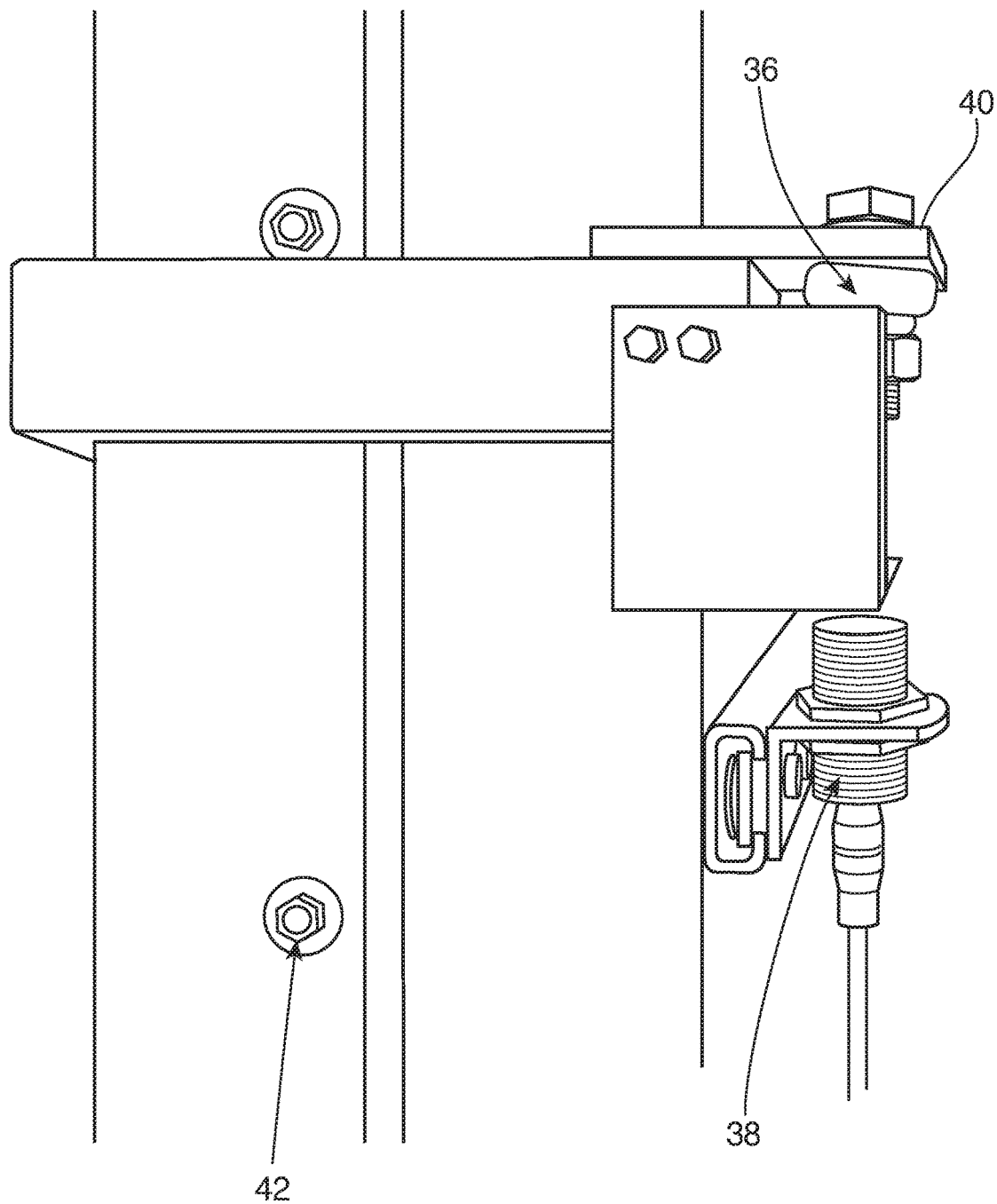
FIG. 6-7 are close-up perspective views of a proximity sensor to detect the position of the gate shown in FIG. 5.
Figure 7:
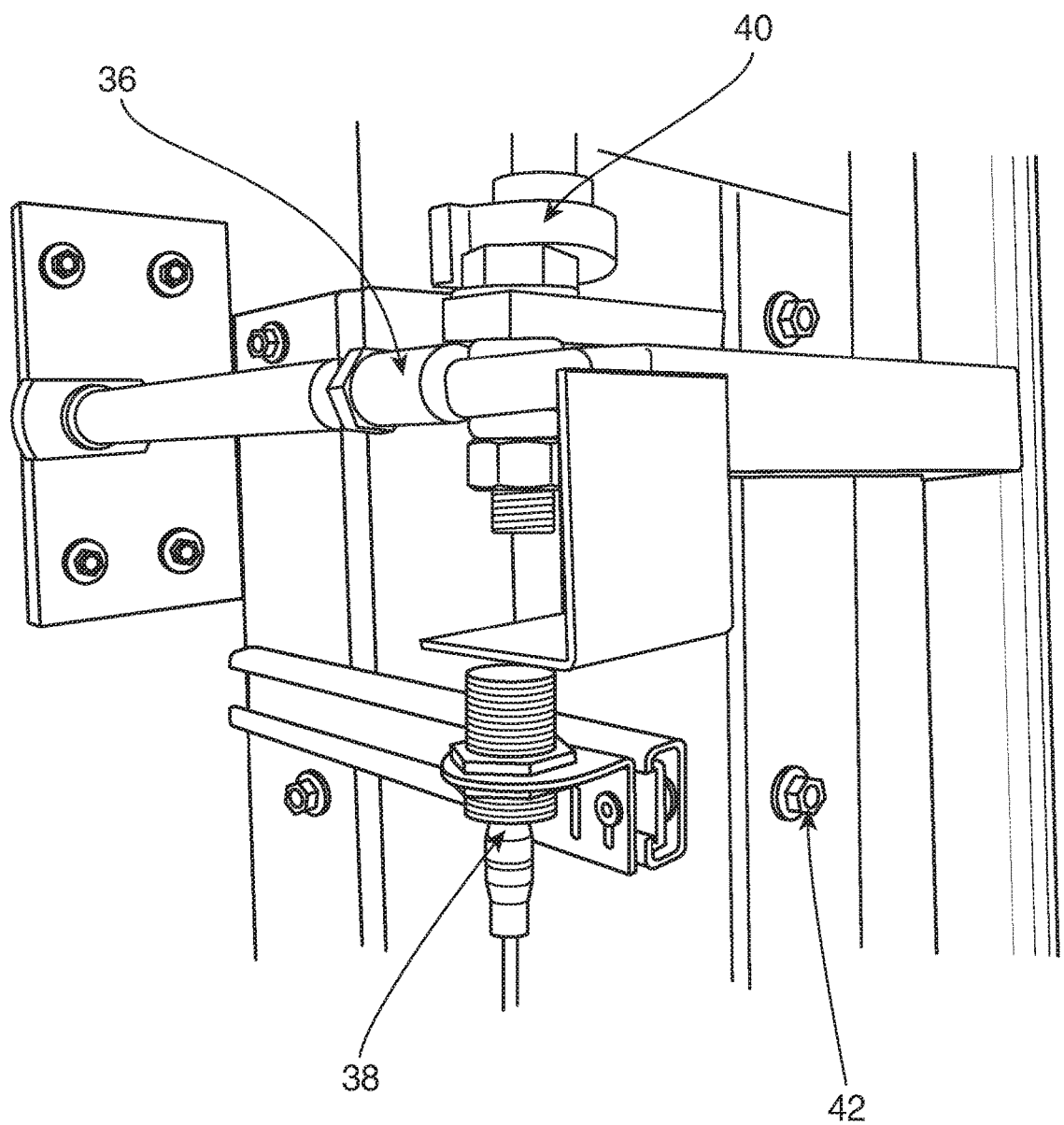

Near the actuator in the bottom right of FIG. 5 is a proximity sensor 38. Proximity sensor 38 detects a position of the door(s)/gate(s). FIG. 6-7 are close-up perspective views of the proximity sensor 36 to detect the position of the gate 22 (e.g., open or closed) shown in FIG. 5.

In the upper right of FIG. 5 is seen a part of the hinge 40 that guides the door(s)/gate(s). The hexagonal shapes that travel along two vertical lines are bolts 42 that attach the linear guidance system to raise/lower the walls 20a-d. At the very top of FIG. 5, the top segments 44 of the walls 20a-d are bent at an angle. This helps prevent the product (e.g., bags 2) from catching a sharp corner on the top of the walls 20a-d.

Figure 8:
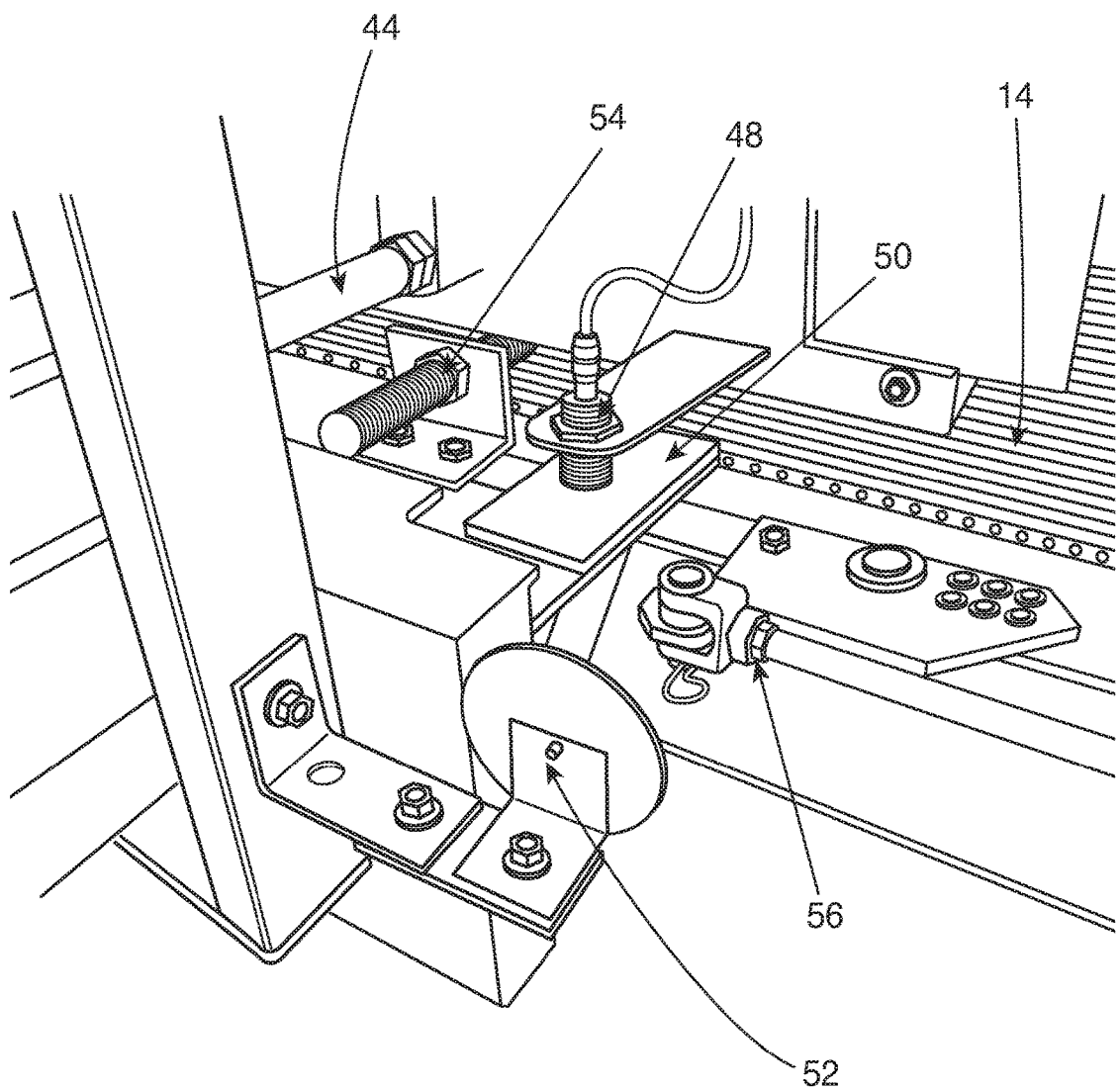
FIG. 8 is a close-up perspective view of a portion of an example side wall.

FIG. 8 is a close-up perspective view of a portion of an example side wall (e.g., walls 20a or 20c) and various pallet handling components. In the upper left of the drawing is an actuator 44. Actuator 44 moves the side wall in to squeeze the loaded pallet (e.g., as illustrated in FIG. 2A).

Actuator 44 also moves the side wall away from the full pallet to pull the side wall away from the loaded pallet (e.g., as illustrated in FIGS. 2B-2E). For example, side wall 20a is shown pulling away toward the left at the top of the wall in the direction of arrow 46a, and side wall 20c is shown pulling away to the right at the top of the wall in the direction of arrow 46c. In an example, the rear wall 20b is station. However, in another example, the rear wall 20b may include one or more doors to form a gate, similar to the front exit gate 22. In another example, the rear wall 20b may also pull away at the top of the wall, e.g., in the rearward direction illustrated by arrow 46b.

In the middle of the drawing figure is a cylinder shaped proximity sensor 48. Sensor 48 monitors the position of the side wall. A plate with a cam roller 50 is provided to support the weight of the side wall. In this example, the plate is shown with the cam roller attached to the side wall near the bottom riding on the plate. The photo eye and reflector system is mounted near the bottom of the pallet auto box 10. This photo eye and reflector system 52 is provided to determine if an empty pallet 1 is in place before placing/dropping product (e.g., bags 2) onto the pallet 1. In FIG. 8, the reflector is visible, and the photo eye is not visible on the other side.

The conveyor 14 that is moving pallets 1 is seen inside and underneath the pallet auto box 10. As the pallet 1 is driven into the loading area 16 of the pallet auto box 10, the pallet 1 is guided to be centered by pallet guides 54. A separate pallet stop system 56 is seen in the bottom right of the drawing. The pallet stop system 56 allows the full pallet 1 to drive out on the running conveyor 14, at the same time an empty pallet 1 is driven in place in the loading area 16.

Figure 9A:
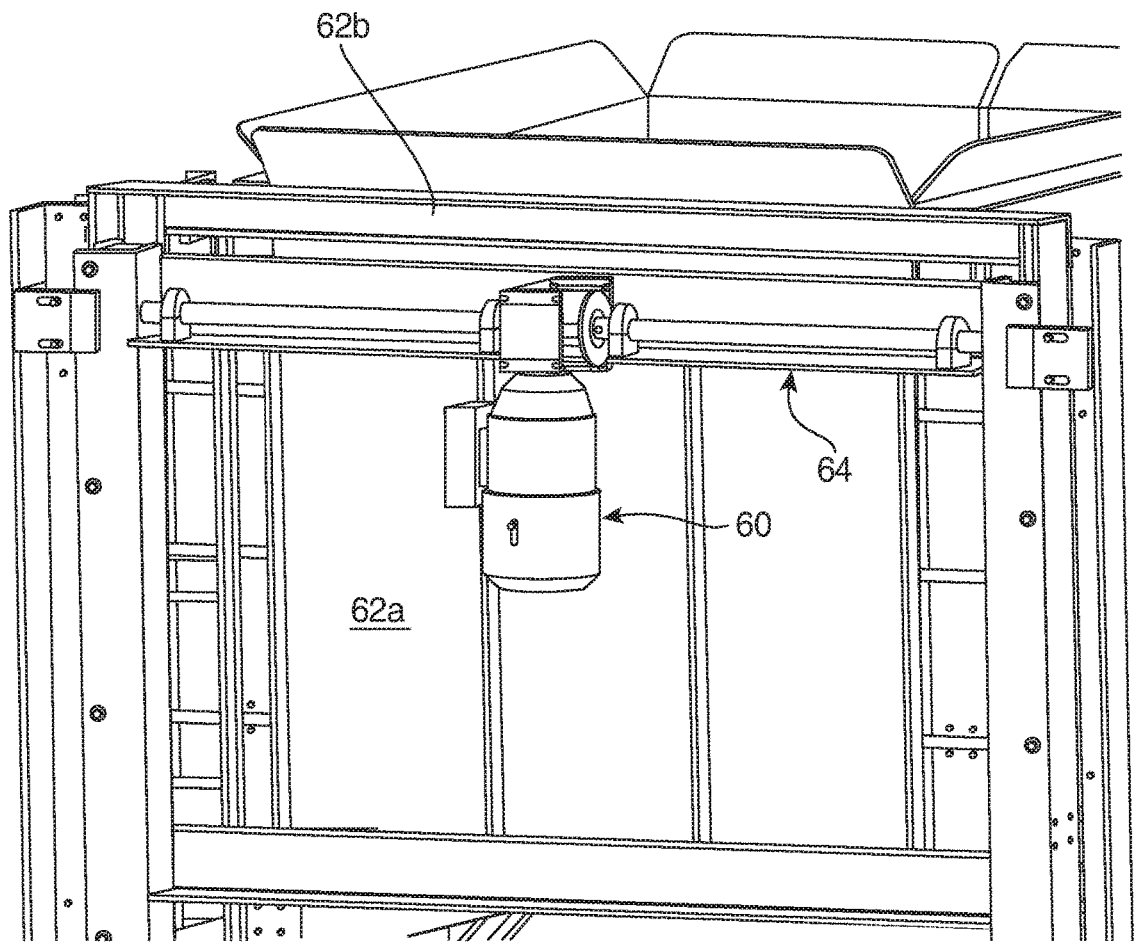
FIGS. 9A-B are close-up perspective views of a motor drive to raise and lower the walls.
Figure 9B:
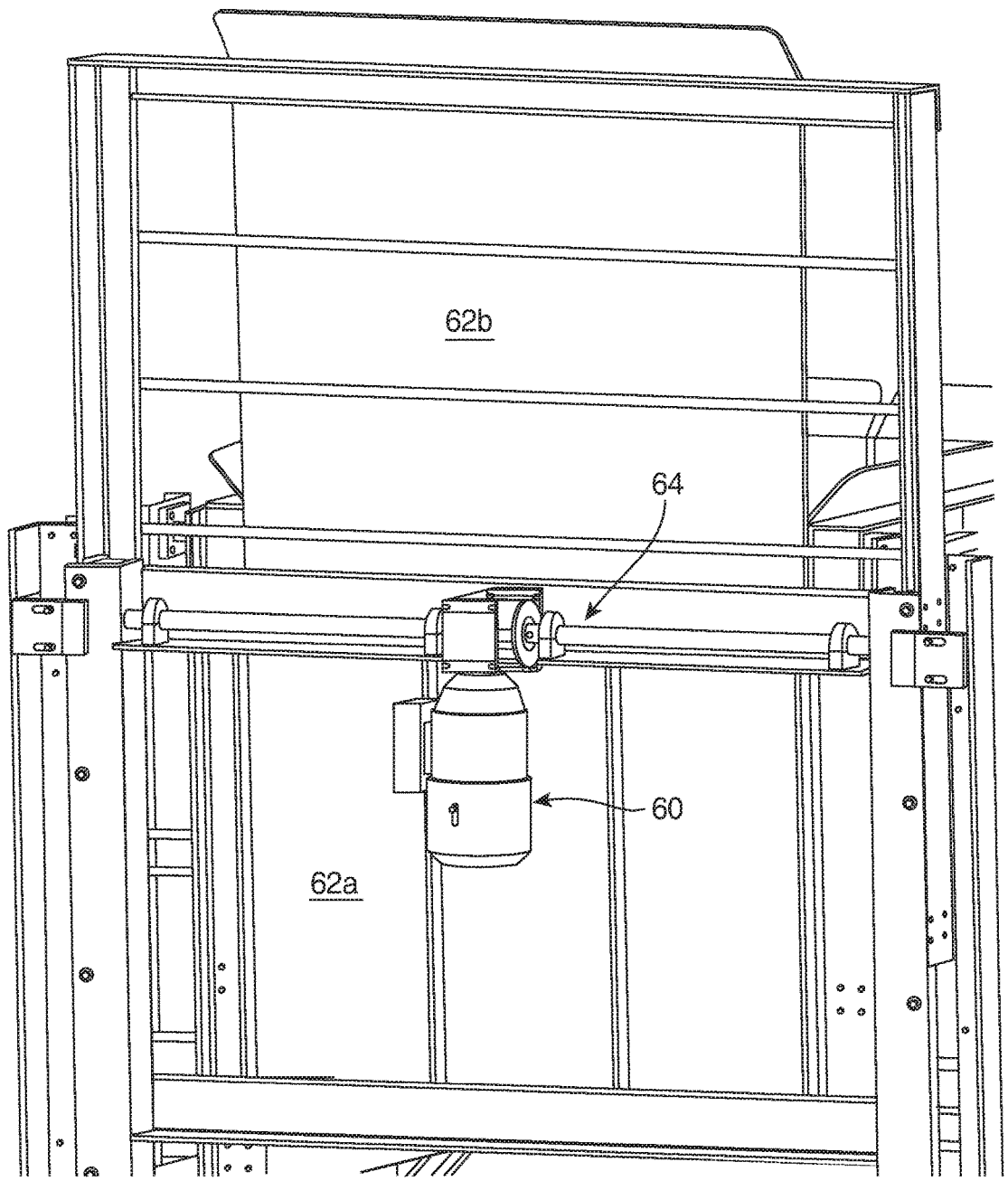

FIGS. 9A-B are close-up perspective views of a motor drive 60 to raise and lower the segments 62a and 62b of a wall (e.g., wall 20a). In FIG. 9A, the wall segment 62b is shown in a lowered position, telescoping alongside wall segment 62a. In FIG. 9B, the wall segment 62b is shown in a raised position (e.g., to the second level 26 described above).

As described above, the pallet auto box 10 has walls 20a-d that raise and lower for various pallet heights (e.g., level 24 and level 26). The pallet autobox 10 has door(s) and/or gate(s) (e.g., gate 22 having two side doors) that open/close to enable full and empty pallets 1 to move in and out of the loading area 16. In an example, the side walls 20a and 20c move in and out to squeeze and release a full pallet. In another example, the rear wall 20b and/or front gate 22 may also move in and out to squeeze and release a full pallet.

In an example, a form of linear bearing guides the wall segments. The motor rotates the shaft 64 with end gears on a gear rail (not shown) on either side of the shaft 64 (e.g., a rack and pinion mechanism) to raise and lower the walls. In an example, a rail with linear bearing blocks can be implemented. A fixed axial bearing rail with cam follower bearings may also be implemented.

In an example, a telescoping feature works to guide the wall segments 62a and 62b up and down and into the desired position. In an example, this is accomplished by a smaller tube-like structure in a larger tube-like structure. For smoother operation a wear surface can be attached to one of the structures in between. For the side walls 20a and 20d, a pivot point is needed. In an example, a set of radial bearings is used to create a hinge.

It is also possible that the side wall will need linear motion. In this case, a linear bearing may be provided, similar to the style used to raise and lower the walls. A pivot point can be used for the door(s) and/or gate(s). A sliding door(s) and/or gate(s) can also provided, e.g., with a linear bearing.

As described above, there are proximity sensors and/or photoeyes with reflectors, and/or lasers at various positions on the pallet auto box 10. These may be implemented to detect various positions and/or status to control operation. Examples include, but are not limited to detection of the positions of pallet auto box features, and if an empty pallet is in position. For each of these aspects, an actuator provides the force to move the part.

In another example, a pneumatic actuator (not shown) may be implemented to raise and lower the walls. Pneumatic actuators can also be used as the actuators for the other aspects described herein for the pallet auto box 10.

Examples include pneumatic actuators for actuating the side walls and door(s) and/or gate(s).

In an example, the pneumatic actuator includes an air cylinder sized in bore diameter and stroke length. Solenoids extend and retract each air cylinder as needed. Pressure regulators and/or flow controls can be installed as needed.

In another example, a hydraulic system (not shown) may be implemented to raise and lower the walls. The guides and sensors may be the same as those already described above.

For some applications a hydraulic and/or pneumatic will not work. In this case a rack and pinion system (not shown) can be provided. In an example, a motor with a gearbox turns a shaft that is mounted with radial bearings. This shaft turns the pinion and moves the rack. This raises/lowers the walls. Using motors, gears, chains/belts all the features of the pallet auto box can be operated.

It is noted that the examples shown and described are provided for purposes of illustration and are not intended to be limiting. Still other examples are also contemplated.

The invention claimed is:

1. A pallet auto box, comprising:
    a gate; and
    a first plurality of walls forming four sides of a box when raised around the loading area;
    at least one wall of the first plurality of walls that raises and lowers adjacent a loading area for a pallet, the box raising to a first level to receive items on the pallet, the box raising to a second level to receive more items on the pallet;
    wherein the at least one wall is raised to maintain a border around the loading area for the items to be stacked within the loading area on the pallet;
    wherein the first plurality of walls pull away from the loading area after loading the pallet;
    wherein the gate opens after the pallet has been loaded so that the loaded pallet can be moved out of the loading area and a next pallet can be moved into the loading area.

2. The pallet auto box of claim 1, wherein the at least one wall is lowered after the pallet is removed from the loading area for stacking bags onto the next pallet.

3. The pallet auto box of claim 1, further comprising a first conveyor to move the pallet into the loading area.

4. The pallet auto box of claim 1, further comprising a second conveyor to move items adjacent the loading area.

5. The pallet auto box of claim 4, further comprising a robot arm to load items from the second conveyor onto the pallet in the loading area.

6. The pallet auto box of claim 1, further comprising a plurality of walls forming four sides of a box when raised around the loading area.

7. The pallet auto box of claim 1, wherein the first plurality of walls of the box raise to the first level.

8. The pallet auto box of claim 7, further comprising a second plurality of walls also forming four sides of the box when raised around the loading area.

9. The pallet auto box of claim 8, wherein the second plurality of walls raise higher than the first plurality of walls to the second level.

10. The pallet auto box of claim 8, wherein the second plurality of walls slidably engage the first plurality of walls.

11. The pallet auto box of claim 1, wherein the first plurality of walls lower again after loading the pallet.

12. A pallet auto box with robot palletizer, comprising:
    a conveyor to move a pallet into a loading area adjacent a robot arm for loading bags onto the pallet;
    an auto box having four walls; the four walls raise during loading of the pallet to maintain a border around the edge of the pallet for the bags to be stacked on the pallet;
    wherein the four walls pull away from the pallet after loading the pallet; and
    at least one of the four wall opening as a gate after the pallet has been loaded so that the loaded pallet can be moved out of the loading area.

13. The pallet auto box with robot palletizer of claim 12, wherein the four walls lower after the loaded pallet is moved out of the loading area.

14. The pallet auto box with robot palletizer of claim 13, wherein a next pallet is moved into the loading area.

15. The pallet auto box with robot palletizer of claim 13, wherein the four walls are lowered again for stacking bags onto a next pallet.

16. A method of operating a pallet auto box, comprising:
    positioning a pallet on a loading area adjacent items to be loaded onto the pallet;
    raising at least one wall of a plurality of walls of the auto box as the items are stacked onto the pallet to maintain a border around the edge of the pallet for the items to be stacked on the pallet to adjust for different heights by going higher as a stack of the items grows higher;
    pulling the plurality of walls away from the loading area after loading the pallet; and
    opening a door or gate of the auto box after the pallet has been loaded so that the loaded pallet can be moved out of the loading area.

17. The method of claim 16, further comprising raising the at least one wall of the autobox to a first level to load items onto the pallet, and then raising the at least one wall of the autobox to a second level to continue loading items onto the pallet.

18. The method of claim 16, further comprising lowering at least one wall of the auto box loading a next pallet moved into the loading area.

* * * * *